United States Patent Office.

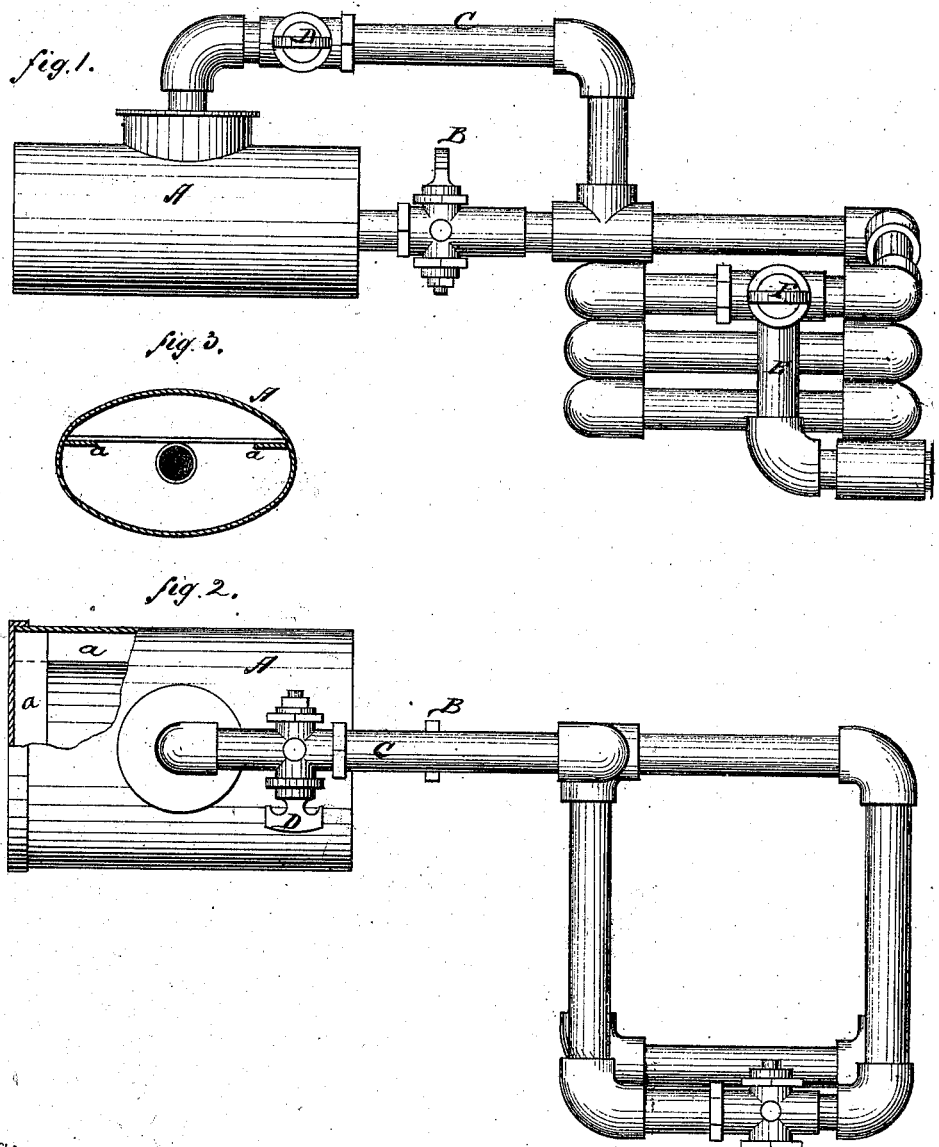

JOHN HOFFERBERTH, OF BALTIMORE, MARYLAND.

Letters Patent No. 105,683, dated July 26, 1870.

IMPROVEMENT IN OIL-STILL.

The Schedule referred to in these Letters Patent and making part of the same

*To all whom it may concern:*

Be it known that I, JOHN HOFFERBERTH, of Baltimore, in the county of Baltimore and State of Maryland, have invented a new and useful Improved Oil-Still; and I do hereby declare that the following is a full, clear, and exact description thereof sufficient to enable those skilled in the art to which my invention appertains to make and use the same, reference being had to the accompanying drawing making part of this specification, and to the letters and figures marked thereon.

The nature of my invention consists in providing an oil-still with a short worm, for the purpose of allowing gasoline, and other inflammable products of distillation, to escape without combining with the refined oil; also, in connecting the long worm at a point below the top of the still, and providing a means for preventing the oil from ascending higher than such point of connection.

In the drawing—

Figure 1 is a side elevation.
Figure 2 is a top view.
Figure 3 is a transverse vertical section.

The still is made in any suitable form, preferably that of a flattened cylinder, and is placed in a horizontal position over the furnace. The worm is made in the ordinary form, and of any suitable length.

It is connected to the still A at one end, at or near the center, and, at a short distance from the point of connection, it is provided with a two-way cock, B.

Attached to the top of the still is a connecting-pipe, C, which is provided with a two-way cock, D, and which connects with the worm at a point beyond the cock B.

In the first turn of the worm I attach a pipe, E, in such a position as to conduct the products of distillation from that portion of the worm.

At the point of attachment of the pipe E is a three-way cock, F, which, when in the position shown in the drawing, allows the vapor of distillation to traverse the entire length of the worm, and, when perpendicular to that position, it cuts off communication with the portion of the worm beyond it, and opens communication with the pipe E.

When the process of distilling is first commenced, the cock B is closed, the cock D is opened, and the cock F is turned in a position perpendicular to that shown in the drawing. The first products of distillation are conducted away by the pipe E, until the gasoline and other inflammable vapors have all been extracted, when the cock F is turned in the position shown in the drawing, and the products of distillation are made to traverse the entire length of the worm.

When the oil in the still becomes exhausted to a point below the center, the cock B is opened and the cock D is closed, and the products of distillation leave the still at the end instead of the top, the oil being prevented from rising too high in the still by means of flanges *a a*, projecting from the sides, as shown in figs. 2 and 3.

What I claim as new, and desire to secure by Letters Patent, is—

1. The short worm for the escape of gasoline, when constructed and operating as shown and described.

2. The flanges *a*, arranged as shown and described, for the purpose specified.

JOHN HOFFERBERTH.

Witnesses:
E. R. BROWN,
M. C. MITCHELL.